Nov. 4, 1952 W. J. LEWIS 2,616,992
TROLLEY BASE
Filed Aug. 19, 1950

INVENTOR.
WARREN J. LEWIS
BY
ATTORNEY

Patented Nov. 4, 1952

2,616,992

UNITED STATES PATENT OFFICE 2,616,992

TROLLEY BASE

Warren J. Lewis, Mansfield, Ohio, assignor to The Ohio Brass Company, Mansfield, Ohio, a corporation of New Jersey Application August 19, 1950, Serial No. 180,457

2 Claims. (Cl. 191—70)

This invention relates to trolley bases and has particular reference to a base which is specially adapted for use on mine locomotives.

It has been observed that the present day trolley bases in mine use are very sluggish in action and this was traced to the high pressure upon the bearings made necessary by the extremely short coupled springs in such bases.

In my improved base I make use of a steel spring either preloaded or of open coil construction as the entire support for the trolley pole without the use of bearings in its vertical movement.

This form of construction reduces friction to a point where it is practically eliminated or at least negligible.

Figure 1:
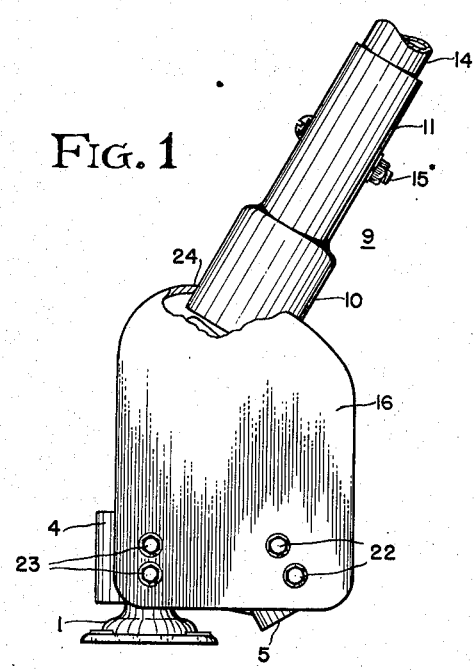
Fig. 1 is a side view in elevation of my trolley base.
Figure 2:
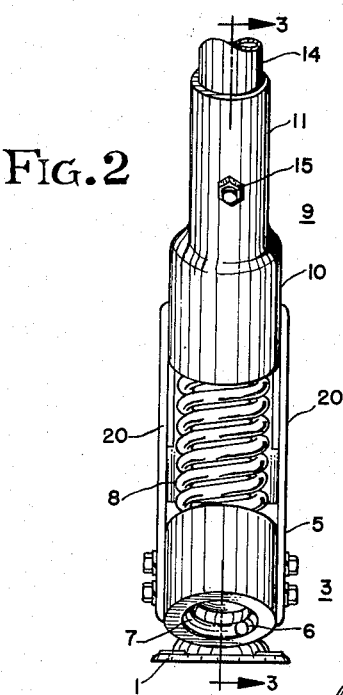
Fig. 2 is another side view of my trolley base taken at right angles to the view in Fig. 1.

In the preferred construction is shown a pedestal base 1 for attachment to the locomotive; mounted thereon is a ball bearing race 2 for ease of rotation of the turret 3 about a vertical axis.

The inner portion of the race is secured to the pedestal of the base and the outer portion is secured to the turret so that the two portions rotate relative to each other when the turret rotates relative to the base.

The turret 3 has an inverted cup-shaped portion 4 which encloses the pedestal portion of the base 1 and has an obliquely disposed sleeve-like portion 5 integral with the portion 4. The axis a—b of the sleeve-like portion intersects the vertical axis of rotation x—y of the base 1 at the point o above the base.

The wall at the opening 6 through the sleeve-like portion 5 is formed with a spiral groove 7 conforming to the pitch and diameter of the coils forming the supporting spring 8 which has one end mounted in the sleeve portion 5 by rotation as in the case of a bolt in a threaded opening.

Mounted on the other end of the spring 8 is a pole support 9 which has a spring socket portion 10 and a pole socket portion 11. The recess 12 in the spring socket portion 10 is provided with a helical groove 13, as in the case of the sleeve-like portion 5, in which recess 12 is mounted the said other end of the spring 8.

The pole-socket portion 11 has a plain tubular passage in which is positioned the lower end of a trolley pole 14, to the extreme upper end of which may be mounted a current collector, now common practice. The pole may be held in place by a through bolt 15.

With the description of the base as above described the spring 8 and pole support 9 will take a position corresponding to the oblique axis a—b of the sleeve-like portion 5.

To pretension the spring and give the trolley pole a position more nearly that when it is in service, a cover 16 encloses most of the base and spring and a portion of the pole support (Fig. 3) and has a stop means.

The cover has two spaced side walls 20 connected along one side and part of the top by a wall 21. The cover is secured in position by cap-screws 22 which are secured to the sleeve-like portion 5 and by cap-screws 23 secured to the portion 4 of the turret. The side opposite the wall 21 is open to permit the pole support and spring to be moved down from their stop position.

The portion 21 of the cover extends to a point 24, determined by the rake desired for the trolley pole to take when the current collector is not in engagement with the trolley wire; the point 24 acts as a stop for the trolley pole should it inadvertently leave the trolley wire. When the pole is in service the support 9 is of course spaced from the stop 24 and the angle of the pole with the vertical axis of the base 1 is greater than that shown in Figs. 3 and 4.

The cover being secured to the turret and to the portion 5 will rotate with the turret about its vertical axis and the side walls 20 will maintain the pole and spring 8 in a vertical plane through the vertical axis x—y of the base.

The base is simple in construction and operation and inexpensive to maintain in good repair.

Figure 3:
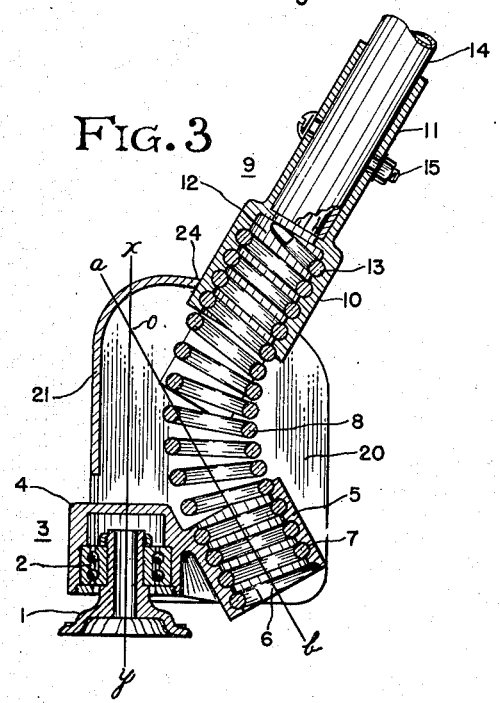
Fig. 3 is a view in partial section taken on the line 3—3 of Fig. 2 and discloses a trolley pole associated therewith.
Figure 4:
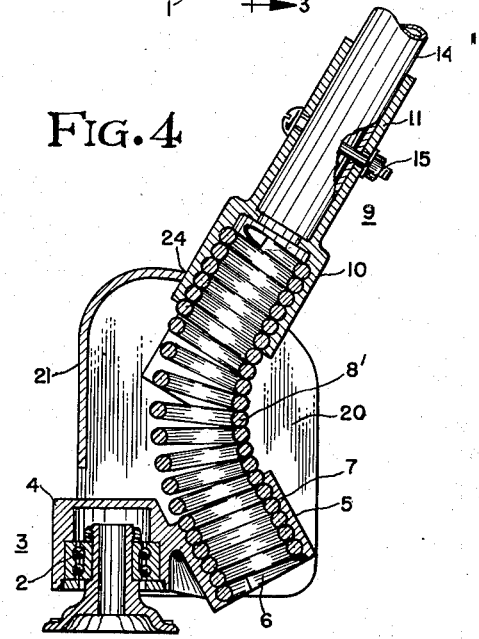
Fig. 4 is a view similar to Fig. 3 of a modified construction.

The modified base shown in Fig. 4 is like that of Fig. 3 except the relation of parts is such that the coils of the spring 8' are closed on the compressed side when the pole is in its stop position.

Having described my invention what I wish to protect is set forth in the following claims.

I claim:

1. A trolley base which includes in combination a base, a turret mounted on the base for easy rotation relative to the base, a spring socket integral with the turret and obliquely disposed with respect to the turret so that the axis of the socket intersects the axis of the turret at a point above the turret, a coiled spring one end of which is in the socket, a pole support attached to the other end of the spring, the axis of the pole support lying in the same plane as the axis of the spring socket and the axis of the turret, vertical guide means confining to said plane the movement of the pole support when the spring is flexed, and a stop which limits the upward unflexing of the spring, the stop being on the same side of the turret as the spring socket whereby at all times the axis of the spring socket makes an acute angle with the axis of the pole support and the spring is thereby flexed and held under tension.

2. A trolley base which includes in combination a base, a turret mounted on the base for easy rotation relative to the base, a spring socket integral with the turret and obliquely disposed with respect to the turret so that the axis of the socket intersects the axis of the turret at a point above the turret, a coiled spring one end of which is in the socket, a pole support attached to the other end of the spring, the axis of the pole support lying in the same plane as the axis of the spring socket and the axis of the turret, and a cover for the turret and spring socket provided with a vertical opening in said plane for movement of the pole support therein when the spring is flexed, the top of the opening forming a stop which limits the upward unflexing of the spring, the stop being on the same side of the turret as the spring socket whereby at all times the axis of the spring socket makes an acute angle with the axis of the pole support and the spring is thereby flexed and held under tension.

WARREN J. LEWIS.

REFERENCES CITED

The following references are of record in the file of this patent:

UNITED STATES PATENTS

| Number | Name | Date |
|---|---|---|
| 347,901 | Van Depoele | Aug. 24, 1886 |
| 396,618 | Short | Jan. 22, 1889 |
| 435,166 | Atwood | Aug. 26, 1890 |
| 452,186 | Jones | May 12, 1891 |
| 466,807 | Sperry | Jan. 12, 1892 |
| 691,236 | Buckley et al. | Jan. 14, 1902 |
| 708,559 | Jenney | Sept. 9, 1902 |
| 933,505 | Volk | Sept. 7, 1909 |